May 7, 1935.  F. VON SCHÜTZ  2,000,308
VOLUME METERING APPARATUS
Filed July 27, 1931
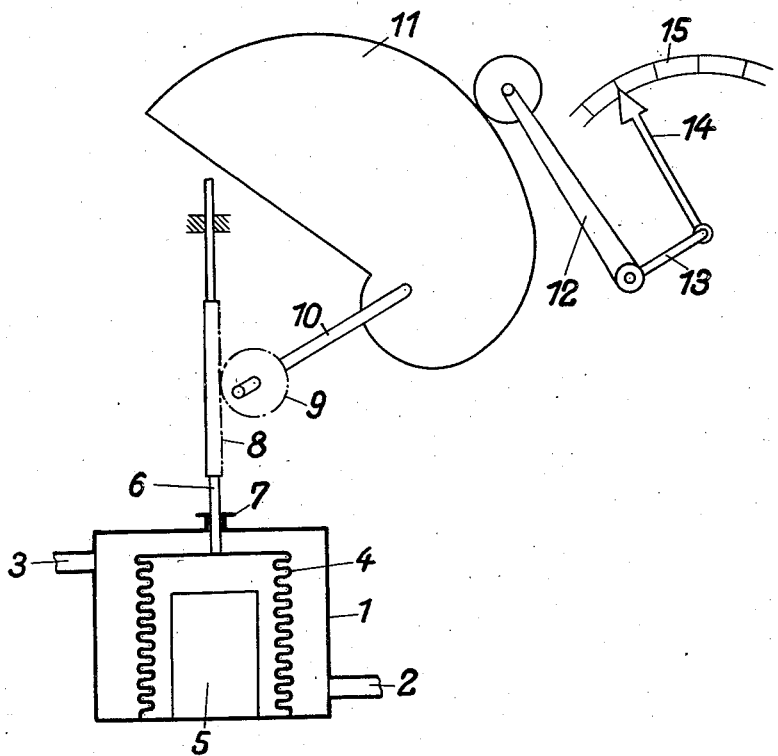
Inventor:
Friedrich von Schütz
By Emil Bönnelycke
Attorney Patented May 7, 1935

2,000,308

UNITED STATES PATENT OFFICE 2,000,308

VOLUME METERING APPARATUS

Friedrich von Schütz, Berlin-Charlottenburg, Germany, assignors to N. V. Machinerieen-en Apparaten Fabrieken "Meaf", Utrecht, Netherlands Application July 27, 1931, Serial No. 553,404
In Germany June 25, 1930

1 Claim. (Cl. 265—44)

The invention relates to a device intended for determining the variable specific volume of gaseous or vaporous agents, i. e., the volume per unit weight or the reciprocal value of the specific gravity of the gaseous or vaporous agent, and has more particularly reference to means for supplementarily determining the specific volume, for instance, in combination with a quantitive measurement of the same gaseous or vaporous agent.

The invention further comprises means for causing this measurement of the specific volume to act directly upon the apparatus which records the quantity, whereby a measurement of the quality is secured, which is in relation to a determined normal state of the agent to be measured.

The device according to the invention comprises a closed measuring vessel which is exposed to the pressure and temperature of the gas to be measured. The vessel itself is filled with a gas which particularly reacts in a sensitive manner upon the change of state of the gas to be measured. In consequence of the alteration of its state the volume of the gas in the vessel alters.

The vessel being resilient in only one direction alters therefore its length, so that this alteration when transmitted to a suitable apparatus makes it possible to determine the specific volume of the gas to be measured. It is necessary, however, that the device be calibrated, for instance, for the normal state of the gas to be measured and that its indicating member stands at zero in this state of the gas. The simplest embodiment of such a specific volume meter consists in an elastic cylindrical vessel which is closed at the top and bottom.

According to this invention, a certain quantity (weight) of a gas, which may be the same as the gas to be measured or another gas, since all gases alter their specific volume in the same degree when pressure and temperature vary (law of Boyl and Gay-Lussac), is enclosed in a closed elastic vessel, and this vessel is exposed to the flowing gas to be measured. The vessel and the gas contained therein therefore assume the temperature of the flowing gas. As the vessel is compressible and expansible, the flowing gas outside will compress it so far that the pressure of the enclosed gas is the same as that of the gas outside. In other words, the enclosed gas has the same state (pressure and temperature) as the flowing gas to be measured. To measure the alterations of the specific volume of the gas enclosed in the vessel is quite the same as measuring that of the flowing gas. As the vessel is expansible only in axial direction, the alteration of its length admits a conclusion of the specific volume of the flowing gas.

In order that the invention may be clearly understood and readily carried into effect, an embodiment of the same is diagrammatically illustrated by way of example in the accompanying drawing, in which the single figure is a diagrammatic view showing an apparatus for indicating the specific volume of the gas to be measured.

The measuring vessel may have a concentrically or helically corrugated shell. As experience has shown vessels of this class may be manufactured from a highly elastic thin-walled material. The resistance of such vessels to expansion in axial direction is comparatively very small so that they are particularly well suited for the object aimed at by the invention. When such a vessel happens to have a certain inherent elasticity, this can be compensated for in a known manner either by a special compensating spring or any other suitable compensating means. When such a compensation is to be dispensed with, it is only necessary to calibrate the vessel empirically in order to eliminate the measuring errors due to the elasticity or the like. The elasticity in radial direction is very small even with a very thin-walled shell so that errors are not to be feared in this respect. Furthermore, the vessel is not exposed to any stress by pressure since the state of the gas contained therein corresponds at any time to that of the surrounding agent.

According to the required range of measurement the contents of the vessel may be diminished by a built-in solid body or by filling it partly with a liquid.

A chamber 1 is provided having an inlet 2 and an outlet 3 for the gas to be measured. At the bottom of the chamber 1 a cylindrical corrugated vessel 4 is attached which is closed and filled with gas. Inside the vessel there may be a displacer 5. To the head of the vessel is secured a rod 6 which by means of a bushing 7 passes through the cover of the casing. Outside the casing the rod is provided with a rack 8 which engages with the toothed wheel 9 rigidly connected to the shaft 10. To shaft 10 is also rigidly secured a cam 11 which engages with a rocking lever 12 connected rigidly to the shaft 13. The shaft 13 carries a pointer 14 moving over the dial 15.

The operation of the apparatus is as follows. If the temperature or pressure and therefore the specific volume of the gas inside the box 1 alters, the gas contained in the vessel will alter its volume correspondingly. The vessel 4, being resilient in its axial direction, will alter its length. The stroke of the vessel is transmitted by means of the rack 8, toothed wheel 9, shaft 10, cam 11, rocking lever 12, shaft 13 to the pointer 14 which will indicate on the dial the specific volume of the gas to be measured. As the alteration of the length of the vessel is much larger at low pressures of the gas to be measured than it is when the pressure is high, the cam 11 is so calibrated that the deflections of the rocking lever are proportional to the logarithms of the values of the specific value of the gas to be measured. The use of a logarithmic scale implies the advantage that the relative errors of indication due to dead play in the transmitting mechanism or the like are the same over the whole range.

As the alteration of the length of the vessel at the same relative alteration of the state of the gas is much larger at low pressure than at high pressure of the gas (if the pressure increases by 10% from 1 kg/cm$^2$ to 1.1 kg/cm$^2$ the volume of the gas contained in the vessel decreases from 100% to 91%, and if the pressure increases by 10% from 9 to 9.9 kg/cm$^2$ the volume decreases from 11.1 to 10.1%, assuming the temperature remains constant), the graduation of the scale would be very distorted. In order to avoid this, means are provided according to the present invention for rectifying the scale in such a way that the deflections of the pointer are proportional to the logarithms of the values of the specific weight of the gas. This logarithmic scale is attained by means of a cam.

I claim as my invention:—

In an apparatus for measuring the specific volume of gases, a casing having a gas inlet and a gas outlet, a closed cylindrical hollow vessel in said casing, this vessel being elastic in its axial direction and adapted to be filled with a gas, a solid body in said vessel for diminishing the volume of gas contained in the vessel, a shaft, means for converting the stroke of said vessel to a pivotal movement of said shaft, a cam connected rigidly to said shaft, a second shaft, and a rocking lever pivoting around said second-mentioned shaft and operatively connected to said cam and a pointer connected to the rocking lever, the said cam being so calibrated that the deflections of the rocking lever are proportional to the logarithms of the values of the specific volume of the gas contained in the vessel.

FRIEDRIC VON SCHÜTZ.